United States Patent [19]

Sado et al.

[11] 4,253,088
[45] Feb. 24, 1981

[54] ELECTRONIC SCHEDULER

[75] Inventors: Ichiro Sado; Juji Kishimoto, both of Tokyo; Mitsuo Cho, Ina, all of Japan

[73] Assignee: Canon Kabushiki Kaisha, Tokyo, Japan

[21] Appl. No.: 89,457

[22] Filed: Oct. 30, 1979

[30] Foreign Application Priority Data

Nov. 7, 1978 [JP] Japan ................. 53/136266

[51] Int. Cl.³ .................. G06K 7/06; H04Q 9/00
[52] U.S. Cl. .................. 340/149 R; 340/141 MD; 340/147 R
[58] Field of Search .......... 340/149 A, 149 R, 147 R, 340/147 MD

[56] References Cited

U.S. PATENT DOCUMENTS 3,860,911  1/1975  Hinman ................. 340/149 R

*Primary Examiner*—Harold I. Pitts
*Attorney, Agent, or Firm*—Fitzpatrick, Cella, Harper & Scinto

[57] ABSTRACT

An electronic scheduler includes a comparator for comparing schedule information to be newly stored with schedule information already stored in the memory. Circuitry is provided for determining whether the output of comparison from the comparator falls within a predetermined range, and an alarming circuit for giving an alarm in response to the output present within said range.

2 Claims, 2 Drawing Figures

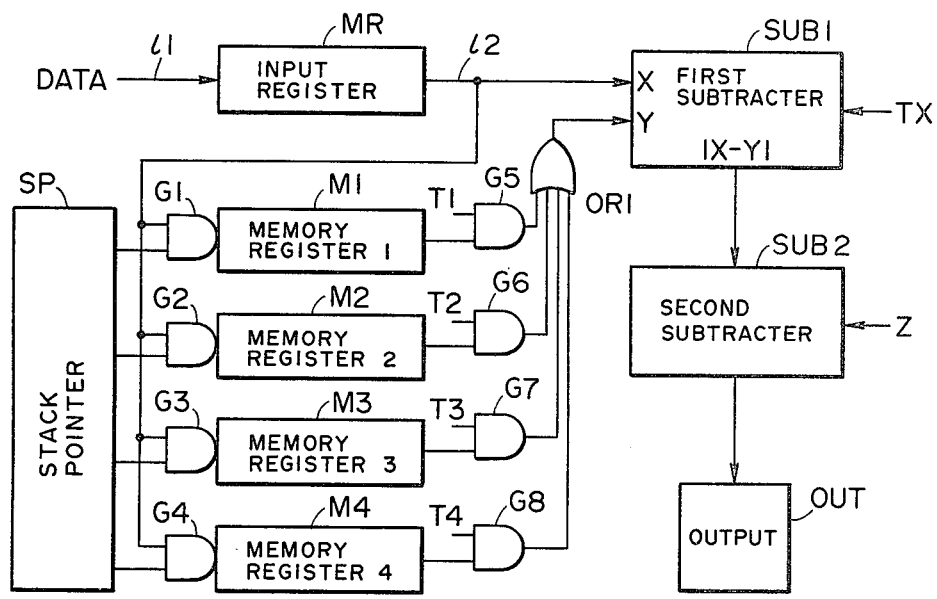
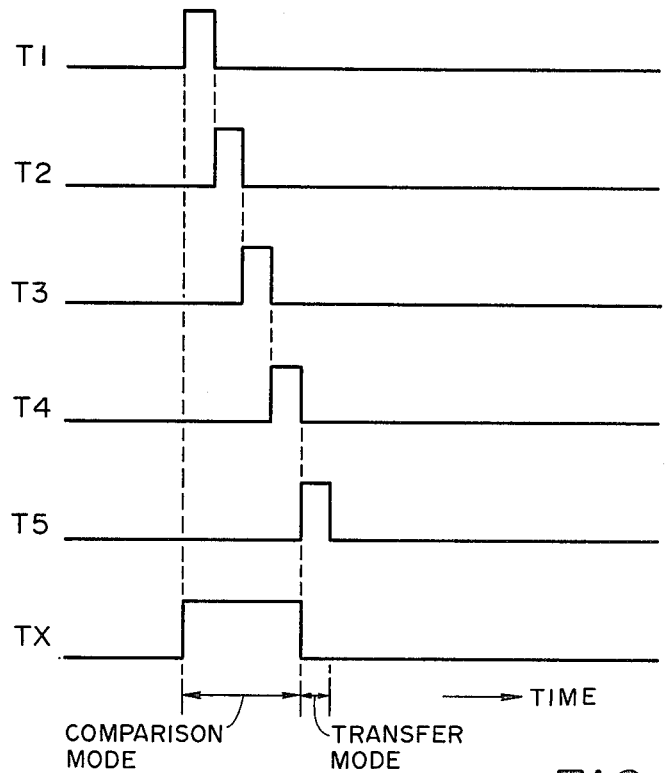
FIG. 1
FIG. 2

ELECTRONIC SCHEDULER

BACKGROUND OF THE INVENTION

1. Field of the Invention

The present invention relates to an electronic scheduler, and more particularly to a scheduler capable of avoiding overlapped storage of same or similar schedules.

2. Description of the Prior Art

Conventionally the scheduling is achieved most simply with a notebook, a schedule chart or a blackboard. These media are relatively convenient in finding eventually overlapping schedules at the writing of schedule information such as a date or a time, but are inconvenient for writing or changing a lot of schedule information. For this reason there is already proposed an electronic scheduler for storing schedule information by electronic circuitry, but such a scheduler is defective in the difficulty in finding the overlapping schedules since all the schedule information cannot simultaneously be displayed on a small display unit.

SUMMARY OF THE INVENTION

An object of the present invention is, therefore, to provide an electronic scheduler capable, in case same or similar schedule information is already stored at the entry of new schedule information, of detecting such already stored schedules to given an alarm.

The electronic scheduler of the present invention is featured in comparing the schedule information to be newly stored with the schedule information already stored in each of plural memories and giving an alarm in case the result of such comparison lies within a predetermined range, thereby preventing the overlapping storage of the schedule information.

The present invention will now be clarified in detail by the following description taken in conjunction with the attached FIG. 1 and FIG. 2.

DESCRIPTION OF THE ATTACHED DRAWINGS

FIG. 1 is a schematic block diagram of the electronic scheduler in accordance with the present invention; and FIG. 2 is a time chart showing the timing signals and execution time instruction signals in the comparison mode and the transfer mode.

DESCRIPTION OF THE PREFERRED EMBODIMENTS

Referring to FIG. 1 showing an embodiment of the electronic scheduler of the present invention, there are shown an input DATA of schedule information suitably binary coded with an encoder in response to a key operation, an input register MR for storing the schedule information supplied from a data input line 11, memory register M1, M2, M3 and M4, a memory selector such as a stack pointer SP, AND gates G1–G8, and an OR gate OR1. The output X of input register MR is supplied to an input terminal of each of AND gates G1–G4, of which the other input terminals are connected to the selection output terminals of the stach pointer SP and of which outputs are respectively stored in the memory registers M1–M4. The output signals from memory registers M1–M4 are respectively supplied to input terminals of the AND gates M5–M8 of which the other terminals respectively receive the comparison mode timing signals T1–T4 generated in succession as shown in FIG. 2 after the timing signal T1 to be generated at the entry of new information into the input register MR, and of which AND gates outputs are supplied to the OR gate OR1. The stach pointer SP receives a transfer mode timing pulse T5 to be generated in the transfer mode after the comparison mode ending at the timing pulse T4 as shown in FIG. 2 to select either one of the memory registers M1–M4 and to transfer the schedule information from the input register MR to thus selected memory register.

In FIG. 1, TX denotes an execution time instruction signal which is maintained during the period of timing signals T1–T4, namely during the comparison mode. A first substracter SUB1, receiving the output X from the input register MR, the OR output Y of the gate OR1 and execution time instruction signal TX, compares output X of the input register MR, by subtraction in this case, with OR output Y obtained from the memory registers M1–M4 through AND gates G5–G8 in succession by the timing signals T1–T4, and generates the difference outputs $|X-Y|$. A second subtracter SUB2, receiving the difference outputs $|X-Y|$ and a tolerance value Z predetermined for example by a read-only memory or a key operation, performs the subtraction of these date and develops a particular signal for example when the result of the subtraction becomes negative, that signal being supplied to an output unit OUT composed for example of flip-flops, gates, a display unit, a buzzer, etc.

In operation of the electronic scheduler of the present invention shown in FIG. 1, upon entry of a new schedule information DATA through the line 11 into the input register MR, there is generated a comparison mode timing signal T1 whereby the first subtracter SUB1 performs the comparison of the output X from input register MR with the content of the memory register M1 in response to the execution time instruction signal TX. For example if the new schedule $X=30$ while the existing schedule $Y=40$, the first subtracter SUB1 produces a signal $|X-Y|=10$ in a suitable binary form. In case the tolerance Z given to the second subtracter SUB2 is predetermined at 5, the subtraction $10-5$ conducted in the second subtracter SUB2 given a positive result so that no particular signal is supplied to the output unit OUT.

In case the memory register M2 stores a value 32, the signal Y becomes equal to 32 at the comparison mode timing signal T2 so that the first subtracter SUB1 provides its difference 2. The second subtractor SUB2 performs the subtraction $2-5$, of which a negative result causes the subtracter SUB2 to generate a particular signal for giving an alarm from the output unit OUT.

As discussed in the foregoing, the present invention, in which two subtracters are employed for the comparison of the present and already existing schedule information and also for the identification whether the result of such comparison lies within a tolerance range, allows to detect eventual overlapping and gives an alarm thereon not only on the same information but also similar information within a predetermined range. In the foregoing embodiment that range is selected as $Z=5$.

Although the comparisons in the foregoing embodiment are achieved by the subtractors, the present invention is not limited to such an embodiment but can employ other electronic circuits for information comparison, such as electronic comparators. It is furthermore possible, in place of using two subtractors or comparators, to conduct two subtractions or two comparison steps with one subtractor or comparator by means of microprogramming technology.

In case of storing time information as the schedule, it is convenient to employ a hexadecimal system. In such a case a hexadecimal correction required at the subtracters SUB1 and SUB2 is easily achievable with the already known technology.

As will be apparent from the foregoing, the present invention allows to store pieces of schedule information with the confirmation if they mutually overlap and still with a simple circuit structure.

What we claim is:

1. An electronic scheduler capable of preventing overlapping storage of schedule information, comprising:

schedule information input means;
   an input memory for storing the schedule information from said schedule information input means;
   a group of memories for successively storing the schedule information from said input memory;
   first comparing means for comparing in succession the schedule information stored in said input memory with the schedule information stored in each of said memories to produce a comparison output;
   second comparing means for determining if the comparison output from said first comparing means lies within a predetermined range to produce an output; and
   alarming means operative in response to the output from said second comparing means to give an alarm in case the schedule information in said input memory is the same as or similar to the schedule information stored in one of said memories.

2. An electronic scheduler according to claim 1, wherein said schedule information comprises date and time.

* * * * *

UNITED STATES PATENT AND TRADEMARK OFFICE
CERTIFICATE OF CORRECTION

PATENT NO. : 4,253,088
DATED : February 24, 1981
INVENTOR(S) : ICHIRO SADO, et al.

It is certified that error appears in the above—identified patent and that said Letters Patent is hereby corrected as shown below:

In the Abstract, line 6, change "alarming" to --alarm--.

Column 1, line 57, change "register" to --registers--;

line 62, change "stach" to --stack--.

Column 2, line 4, change "stach" to --stack--;

line 25, change "date" to --data--;

line 43, change "given" to --gives--;

line 58, change "to detect" to --detection of--.

Column 3, line 10, change "to store" to --storage of--.

Signed and Sealed this

Second Day of June 1981

[SEAL]

Attest:

RENE D. TEGTMEYER

Attesting Officer

Acting Commissioner of Patents and Trademarks